June 18, 1963 K. GEBELE 3,094,056
PHOTOGRAPHIC CAMERA
Filed June 30, 1959 2 Sheets-Sheet 1

June 18, 1963  K. GEBELE  3,094,056
PHOTOGRAPHIC CAMERA
Filed June 30, 1959  2 Sheets-Sheet 2
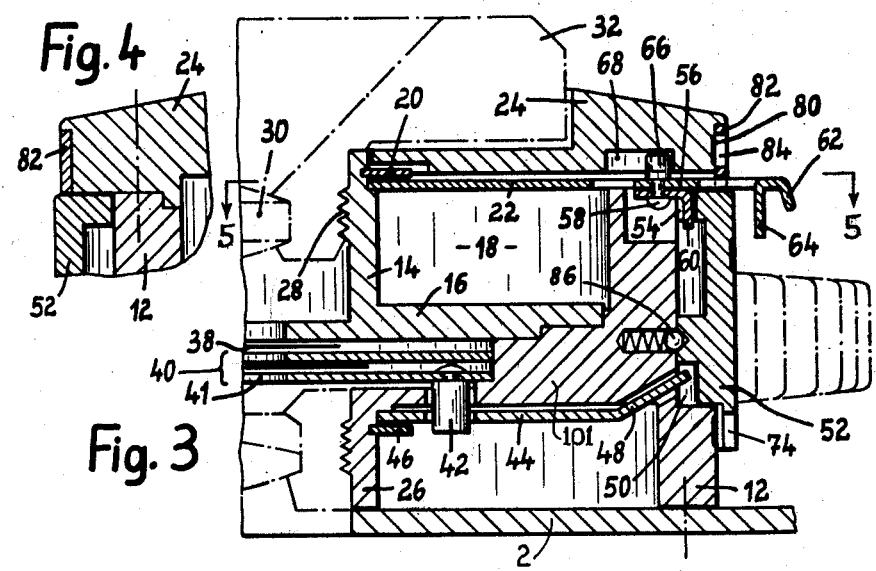
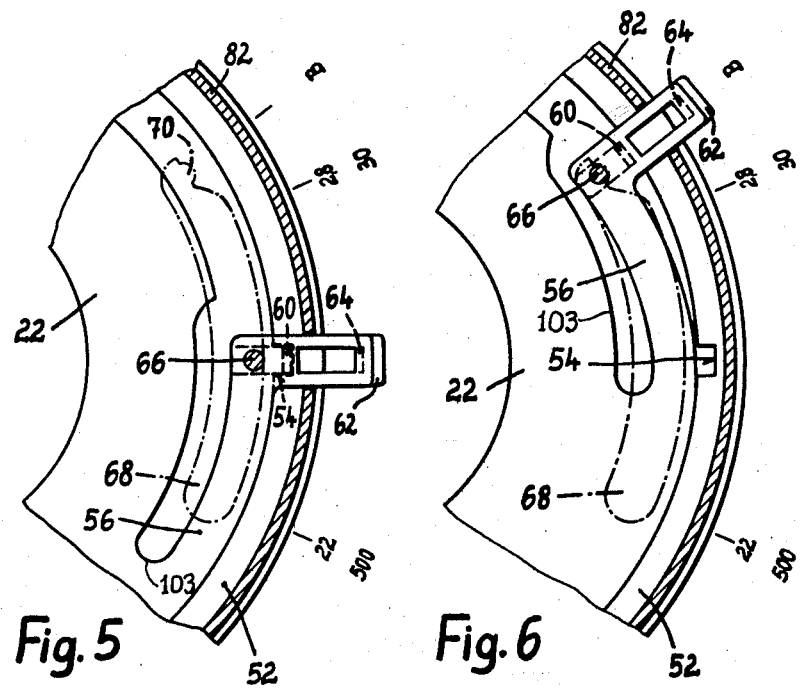

3,094,056
PHOTOGRAPHIC CAMERA
Kurt Gebele, Munich, Germany, assignor to Compur-Werk Friedrich Deckel OHG, Munich, Germany, a firm of Germany
Filed June 30, 1959, Ser. No. 824,052
Claims priority, application Germany July 9, 1958
2 Claims. (Cl. 95—64)

The present invention relates to an adjustable shutter for a simple still camera of the type having control members for the shutter speed and diaphragm aperture which are interconnected for the setting of exposure values.

An object of the invention is to provide a generally improved and more satisfactory still camera having a single relatively simple adjustment for the setting of exposure values.

Another object is the provision of a shutter adjustment for a camera wherein the shutter speed and diaphragm aperture control members are normally interconnected for setting exposure values, but may be uncoupled for the free setting of a selected shutter speed and diaphragm aperture.

Yet another object is the provision of a still camera having a single adjustment for setting exposure values each having a different combination of shutter speed and stop values, and which may be further uncoupled for the free setting of shutter speed and diaphragm aperture values, in such manner that there are no gaps in the series of adjustable exposure values to which the parts may be set.

A further object is the provision of a simple camera wherein the normally interconnected shutter speed and diaphragm aperture control members may be simply and easily uncoupled so that the shutter speed control member may be set for time exposures.

A still further object is the provision of a simple camera having a relatively simple shutter adjustment so arranged that an inexperienced photographer may graduate, without the addition of attachments or resorting to a reconversion, to a more complex shutter adjustment wherein the shutter speed and stop may be set independently of one another and wherein time exposures may be made.

Another object is to provide a simple still camera of the type previously described, in which interchangeable lenses and flash synchronization may also be used if desired.

These and other desirable objects may be attained in the manner disclosed as an illustrative embodiment of the invention in the following description and in the accompanying drawings forming a part hereof, in which:

FIG. 3 is a fragmentary axial cross section taken radially through the objective shutter and the front wall of the camera housing;

FIG. 4 is a smaller fragmentary axial cross section through a portion of the shutter of FIG. 3 taken on a different radial plane;

FIG. 5 is a fragmentary cross section transversely through the shutter of FIG. 3, taken approximately on the line 5—5 thereof;

FIG. 6 is a view similar to FIG. 5 showing the members in an uncoupled arrangement and set for making time exposures.

The same reference numerals throughout the several views indicate the same parts.

Figure 1:
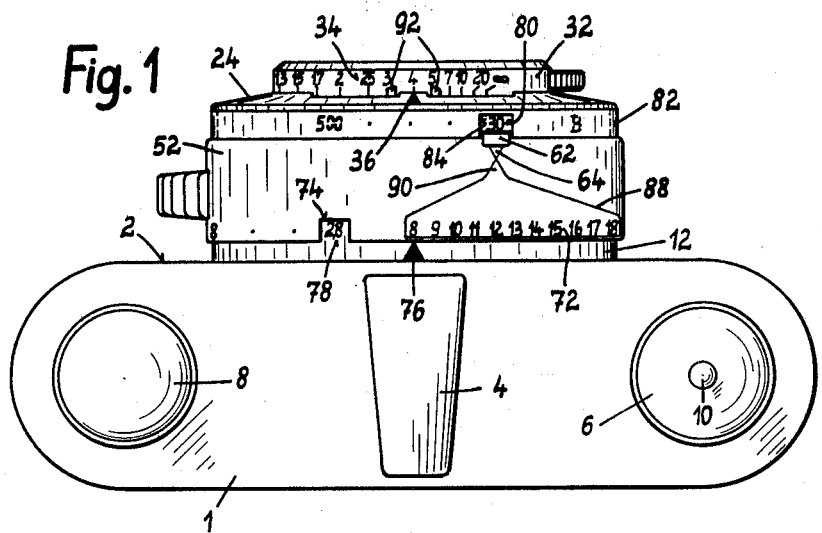
FIG. 1 is a top view of a photographic still camera equipped with a shutter according to the invention.

Referring to FIG. 1, there is disclosed a photographic still camera of the type commonly known as a miniature camera, including a camera housing or body 1 having a front wall 2. Mounted on the top of the camera housing in a manner well known in the art are a direct vision viewfinder 4, knobs 6 and 8 for the transport and rewinding of the film, and a shutter release member 10, conveniently in the form of the usual depressable plunger extending up through the center of the winding or transport knob 6. Secured to the front wall 2 is a cylindrical support 12 which may be integral with or at least forms the mounting support for the main body or housing of an objective shutter according to the present invention.

As shown in FIG. 3, the support 12 is suitably fastened as by screws to the front wall 2 of the camera and is centered at the optical axis of the lenses. The cylindrical support 12 has an inwardly extending approximately centrally located annular flange 101 on the forward surface of which is mounted a base plate or shutter mechanism mounting plate 16. Extending forwardly from the base plate 16 is a front lens tube 14, the forward end of the support 12 together with the lens tube 14 and the base plate 16 forming an annular space 18 for accommodating the drive mechanism of an objective shutter of suitable construction. The shutter drive mechanism may take the form disclosed in Patent No. 1,687,123, to Deckel and Geiger, granted October 9, 1928. Many other known types of shutter may be used equally as well, as the present invention is directed to the means for adjusting and controlling the shutter speed and diaphragm aperture, rather than to the internal mechanism of the shutter, which may accordingly take many different forms known per se. Alternatively, the shutter, except for the manner in which the diaphragm aperture and shutter speed are controlled, as further disclosed below, may be in either of the forms shown in the copending patent applications of K. Gebele, Serial No. 514,218, filed June 9, 1955, (now Patent 2,900,885, granted August 25, 1959), and Serial No. 520,875, filed July 8, 1955 (now Patent 2,900,886, granted August 25, 1959). Both of these applications disclose shutters which can be set or cocked or tensioned by rotation of the film winding member such as the knob 6 of the present application, and which can be released or triggered for making an exposure by depressing a body release plunger like the plunger 10 of the present invention.

The annular space 18 is closed at the front by a shutter speed control ring 22, rotatably supported on a shoulder of the front lens tube 14 and secured against axial motion by a circlip 20 mounted in a groove in the lens tube on the forward side of the ring 22 opposite the aforementioned shoulder. The shutter speed control ring 22 may in general correspond, for example, to the shutter speed control ring 63 in the previously mentioned Deckel and Geiger patent.

The shutter housing or casing is closed at the front by a cover plate 24, stationarily supported as for example by being screwed tightly onto the front lens tube 14. As shown in FIG. 4, the cover plate 24 may be additionally centered and supported by mating rabbets on the plate 24 and the front end of the side wall of the main casing or housing 12.

Extending inwardly from the inner annular edge of the flange 101 is a rear lens tube 26 which is suitably arranged so that an adjustment can be made in order to center the support 12 with respect to the camera housing. The front and rear lens tubes 14 and 26 respectively receive mounts for front and rear lens components of any suitable construction, these being indicated schematically in the drawing. In the preferred embodiment, the front lens component 30 is received in a focusing ring 32 mounted on the front lens tube 14 for axial adjustment by means such as the threads 28. As is well known in the art, focusing of the lenses for distance may be achieved by rotating the focusing ring 32. To ascertain the focusing position, a distance scale 34 (FIG. 1) is provided on the peripheral edge of the ring 32, to be set in cooperation with a mark 36 provided on the front edge of the cover plate 24. The focusing lens and mount is not the subject matter of the present invention, and it is of no consequence so far as the present invention is concerned whether the front member of the lens consists of one or more than one individual lens element, or whether it is rigid, or whether it is replaceable or interchangeable.

Arranged in a suitable manner in an annular space between the base plate 16 and an inner part of the support flange 101 are a plurality of shutter blades 38 and a diaphragm device 40 both of which are indicated schematically in the drawing and may take any suitable form such as shown in the aforementioned Deckel and Geiger patent or in the Gebele applications. The diaphragm device 40 includes a movable diaphragm adjusting ring 41, which is suitably connected for rotation with a diaphragm aperture control ring 44 such as by means of a pin 42 secured to the ring 41 and engaging the ring 44 through an arcuate slot in the support flange 101. The diaphragm aperture control ring 44 is rotatably supported on the rear lens tube 26 and is secured against axial displacement by a shoulder of the lens tube and an opposite circlip 46 mounted in a groove in the tube 26.

The position of adjustment of the diaphragm aperture control ring 44 is determined by the setting of an externally accessible setting ring 52 rotatably journaled on the outer surface of the cylindrical support or main shutter body 12. For coupling the rings 44 and 52, the ring 44 preferably has a slightly forwardly bent arm 48 which extends through an arcuate slot in the support 12 into a recess or notch 50 in the ring 52. The external setting ring 52 is secured against axial displacement by a shoulder on the support and by the overhanging edge of the cover plate 24. It can be readily seen that rotation of the setting ring 52 rotates the control ring 44 and the adjusting ring 41 by a corresponding amount to set the diaphragm aperture.

According to the invention, the shutter speed control ring 22 as well as the diaphragm aperture control ring 44 are normally interconnected with the setting ring 52 so that adjustment of the ring 52 sets both the shutter speed and the diaphragm aperture in mutual dependence, according to a selected exposure value, as will be made more clear. The coupling of the shutter speed control ring 22 with the ring 52 is detachable, however, in accordance with the invention, so that the rings 22 and 44 may be adjusted separately to any desired shutter speed and diaphragm aperture, and so that the ring 22 may be set to a time exposure position.

To provide a detachable coupling between the rings 22 and 52, the ring 22, referring to FIG. 5, has a circumferential cut-out 103 forming a circumferentially extending arm 56 the free end of which extends out radially through an arcuate slot in the cover plate 24 to an externally accessible handle 62. Fastened by means of a rivet 58 to the free end of the arm 56 is a downwardly extending driver 60, which normally in removably received in a recess 54, see also FIG. 6, in the inner edge of the forward part of the setting ring 52, thereby normally coupling the speed control ring 22 and the setting ring 52 for rotation together. The arm 56 is resilient in a radial direction so that manual pressure radially inwardly on the end of the handle 62 may disengage the driver 60 from the recess 54. The outwardly extending end of the handle 62 is provided with a downwardly extending pointer 64, see also FIG. 1, for a purpose which will be explained later.

The rivet 58 fastening the driver 60 on the end of the arm 56 is extended forwardly to provide a pin-shaped end 66 which is freely movable within an arcuate milling or groove 68 in the rear surface of the cover plate 24. The milling 68 has circumferential dimensions corresponding to the setting range of the shutter speed control ring 22. At one end, the outer arcuate edge of the milling 68 is inturned and provided with a notch or semicircular stop trough 70 in which the pin 66 may be removably received. Thus, when the coupling between the driver 60 and the recess 54 has been detached by radially inward pressure on the handle 62, the handle may be turned manually so that the pin 66 slides along the outer arcuate edge of the milling 68 to be received in the stop trough or notch 70. This holds the driver 60 in a position radially inwardly from the inner face of the ring 52, so that it cannot engage in the coupling notch 54, and in this position the circumferential or rotational position of the speed control ring 22 is such that the shutter is set for a "bulb" or "B" exposure. This is the position illustrated in FIGS. 2 and 6.

It can be noted indirectly from the arrangement of the individual shutter speed and diaphragm aperture scales, as illustrated at least schematically in FIGS. 1, 2, 5, and 6, that the shape and arrangement of the shutter speed control ring and of the movable diaphragm ring are such that longer exposure times controlled by the shutter are associated with larger diaphragm apertures, and that the two rings in coupled condition, upon movement of the setting ring 52 in one direction, simultaneously reach the end stop or limit position, characterized by the shortest exposure time and the smallest diaphragm aperture. Upon movement of the setting ring 52 in the other direction, the setting rings 22 and 41 simultaneously reach the extreme or limit position of the ring 41 corresponding to the largest or maximum diaphragm aperture, and the intermediate position of the shutter speed control ring 22 corresponding to the longest instantaneous exposure time possible without a rigid supporting of the camera. This last mentioned time is generally agreed to be about 1/30 of a second, which is about the longest exposure possible with the camera simply held in the hand, without a tripod or other firm support.

When the shutter speed control ring 22 is uncoupled from the setting ring 52 by radially inward pressure on the handle 62, the shutter speed and diaphragm aperture may be set independently of one another to any selected values, and also the shutter speed control ring may further, in accordance with the invention, be moved to a manually timed exposure position (e.g., a "bulb" or "B" exposure position) and also to any one of the possible instantaneous or internally timed exposure positions of longer duration than can be used without a firm support (e.g., positions for exposures of 1/15 second to 1 second, requiring use of a tripod or other firm support).

Figure 2:
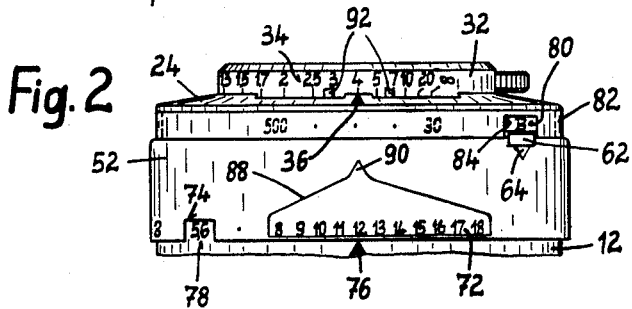
FIG. 2 is a top view of the objective shutter showing the setting members in a different position from that shown in FIG. 1.

The external surface of the setting ring 52, see FIG. 2, is suitably inscribed or printed with a circumferentially graduated exposure value scale 72, covering the values "8" to "18" of the known exposure value series extending from "1" to "18." The shutter adjusting means of the present invention is arranged to cover only the indicated portion of the exposure value scale when the shutter speed and diaphragm aperture rings are interconnected with the setting ring 52 so as to be set together. The scale 72 is readable in cooperation with a mark 76 arranged on the stationary casing or support 12. A window cut-out 74 is provided in the setting ring 52 through which are observable the successive values of a circumferentially graduated diaphragm aperture scale 78 likewise marked on the support 12. A circumferentially graduated shutter speed scale 80 is arranged on the periphery of the cover plate 24 and is masked by a masking ring 82 with the exception of a number visible in a window cut-out 84. The masking ring 82 is rotatably supported on the periphery of the cover plate and is coupled for rotation with the handle 62 of the shutter speed control ring 72 by being appropriately notched out as better shown in FIG. 3, to receive a portion of the handle.

With the driver 60 disconnected from the recess 54 so that the shutter speed control ring 22 and the external setting ring 52 are uncoupled, whereupon the diaphragm aperture may be set to any desired value, the temporary free adjustability of the diaphragm is preferably supplemented by a series of notches formed internally in the ring 52, arranged desirably in half diaphragm steps, into any one of which a spring urged ball 86 is receivable. This provides, in effect, a series of "click stops" at half-diaphragm intervals, i.e., at and also half way between the settings at the usual scale subdivisions such as 2.8, 4, 5.6, 8, 11, 16, etc.

In the preferred embodiment, the exposure value scale 72 is preferably surrounded by a marking 88 having a pointer 90 at its forward end which, in cooperation with the pointer 64 of the handle 62, indicates that the shutter speed control ring and the diaphragm control ring are coupled together for mutual setting. Thus, with the pointer 64 alined with the pointer 90 as shown in FIG. 1, the validity of the exposure value scale is indicated, and this arrangement further facilitates the restoration of the shutter speed and diaphragm aperture coupling. Of course, when the driver 60 is uncoupled from the recess 54, the pointer 64 is moved away from the pointer 90 such as, for example, as shown in FIG. 2.

The operation of the camera is further facilitated when the shutter speed-diaphragm coupling is disconnected by incorporating a suitable depth of field indicating device, although it is to be understood that this feature is not essential to the invention. The depth of field indicating device includes the movable pointers 92, see FIG. 2, readable in connection with the distance focusing scale 34. The pointers 92 are moved mutually toward and away from one another by a transmission or driving means connected to a portion of the diaphragm aperture device 40, such as, for example, in the manner disclosed in the copending patent application of K. Gebele, Serial No. 562,346, filed January 30, 1956, now Patent 2,949,835, granted August 23, 1960. Reference may be made to this application for an explanation of this type of depth of field indicating device.

In the operation of the camera of FIGS. 1 to 6, an exposure value is determined either by using an appropriate exposure value meter or by estimation of the photographer. The setting ring 52 is grasped preferably by means of a finger grip secured thereto to set the selected exposure value on the scale 72 opposite the mark 76. Assuming that the shutter speed control ring 22 is coupled with the ring 52 through the engagement of the coupling 60, 54, as indicated by the alinement of the pointer 64 with the pointer 90, the diaphragm aperture and the exposure time are simultaneously set to a pair of values which together give the proper exposure value and which also will permit an instantaneous exposure which can be effected without a firm supporting of the camera, i.e., possible with the camera held in the hand. As has been explained, this may ordinarily be done when the shutter speed is of no greater duration than $\frac{1}{30}$ of a second. The lens is then focused in the customary manner by rotating the focusing ring 32, preferably by means of a hand grip secured thereto, to aline the proper value on the scale 34 with the mark 36. The picture may then be taken by pressing the shutter release 10, provided of course that the cocking or tensioning of the shutter, which is preferably coupled with the film transport or winding mechanism, has already been effected. In this extremely simple manner which is particularly convenient for beginners, snapshots may be taken in the range of brightness of the object limited by the exposure values "8" and "18."

Should the brightness of the object, however, give an exposure value of less than "8," then this camera may still be used for taking pictures by releasing the coupling between the shutter speed control ring 22 and the setting ring 52 so that the shutter speed and diaphragm aperture may be set independently of one another to selected values. By depressing the handle 62, the coupling connection of the driver 60 with the recess 54 between the shutter speed control ring and the setting ring 52 is disconnected, and the exposure adjustment may now be effected by establishing either the shutter speed or the diaphragm aperture or both together, the value of the diaphragm aperture being shown in the window cut-out 74. The possibility of freely adjusting the diaphragm which now exists makes it possible to control the depth of field through the indicating pointers 92, if this is deemed necessary.

For taking a picture with time exposure, the handle 62 is moved to its limiting position in one direction wherein the pin 66 is engaged in the stop through 70. In this position, the shutter speed control ring 22 is moved to the "B" position, and the desired diaphragm aperture or depth of field may be set by rotating the ring 52.

The arrangement is such that the photographer may also freely choose a selected shutter speed and diaphragm aperture even when the exposure value lies between the values "8" to "18." Should the photographer, for reasons of obtaining greater depth of field, or because of the speed of the object being photographed, desire to have a different combination of exposure time and diaphragm aperture than the interconnected shutter speed and diaphragm coupling can supply, the coupling connection 60, 54 may be unloosened in any desired position of the setting ring 52, so that he may set the exposure time as well as the diaphragm aperture to any values which he may select. In this case, the exposure time indication provided by the portion of the scale 80 visible through the cut-out 84, should now be observed, although in the simpler situation previously explained, there is no need to pay any attention either to the shutter speed showing in the window 80 or to the diaphragm aperture showing in the window 74.

Because of the possibility of eliminating the rigid shutter speed-diaphragm coupling in any position of the setting ring 52, the shutter adjustment of the present invention may further be arranged for flash photography. It will be recalled that the guide number used in flash photography expresses a product relationship or reciprocal relationship between the diaphragm aperture (expressed as $f$ number) and the distance from the flash apparatus to the subject being illuminated by the flashlamp, expressed in suitable units of distance such as feet or meters. In most cases, the flash apparatus is mounted on the camera, so that the distance from the flash apparatus to the subject is the same as the distance from the camera to the subject, and is the same distance used in focusing the lens of the camera. Thus, for example, if one is using guide numbers designated for distances expressed in meters, and if the guide number is, for example, 24, then if the object is at a distance of three meters the diaphragm aperture should be set at $f:8$, or if at a distance of 1.5 meters, the aperture should be set at $f:16$, and so on. This type of use of the camera in accordance with the invention may easily be facilitated by a distance scale divided, for instance, in meters, and arranged on the setting ring 52, possibly being displaceable to account for different guide numbers. If the scale is suitably placed and graduated, setting the ring 52 for the particular distance automatically sets the correct diaphragm aperture. For a further explanation of a suitable mechanism of this type, reference may be made to the copending patent application of two co-workers of the present applicant, P. Fahlenberg and F. Singer, Serial No. 621,719, filed November 13, 1956, now abandoned.

Figure 7:
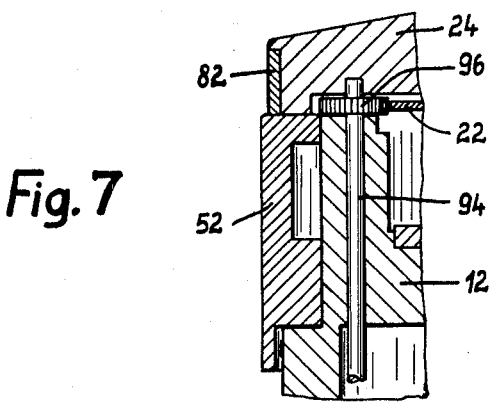
FIG. 7 is a partial axial section through a modified form of objective shutter.

A modified form of the invention is shown in FIG. 7, illustrating a shutter arranged to be coupled with a built-in exposure value meter so that the exposure value scale 72 is unnecessary. For this modification, the shutter speed control ring 22 is provided with gear teeth over a part of its periphery, engaged with the teeth of a pinion 96.

The pinion 96 is secured to a shaft 94 mounted for rotation in the support 12. The shaft 94 is connected by a suitable transmission not here shown with the follow-up pointer of a built-in exposure meter in one type of arrangement, or with the measurement pointer in another type of arrangement. The transmission means may take the form disclosed in the copending patent application of K. Gebele, Serial No. 711,605, filed January 28, 1958, now Patent 2,949,069, granted August 16, 1960. Since the shutter speed control ring 22 is interconnected with the diaphragm aperture control ring 44, it follows that the appropriate exposure value may be set automatically on the camera. For this mechanism, of course, the follow-up exposure value meter device is to be placed out of operation as soon as the brightness of the object drops below an exposure value of "8" or as soon as the shutter speed-diaphragm coupling is disconnected.

The present camera is capable of taking pictures at "instantaneous" shutter speeds (i.e., speeds automatically timed by the internal mechanism of the shutter) slower than 1/30 of a second, but in the preferred form of construction these slower speeds cannot be set so long as the coupling mechanism remains in its normal coupled position. This is an important feature, because the slower shutter speeds can be set only when the photographer consciously and purposely disconnects the coupling. The act of disconnecting the coupling serves to remind the photographer that he is no longer operating within the normal range of simple photography, and helps to make him realize that at the slower shutter speed which he now desires to use, he can no longer simply hold the camera in his hand, but must now provide the camera with a tripod or other firm or rigid support.

The camera developed in accordance with the invention has the advantage that the series of adjustable exposure values no longer have a gap as must be tolerated in the case of other "simple cameras" of previous constructions insofar as these cameras permit time exposures at all. As a result of the free selection of the diaphragm aperture in accordance with the invention, in the case of time exposures, the smallest diaphragm aperture can be used in combination with the shortest exposure time which can be definitely controlled by hand (about one second), thereby enabling one to achieve, in a manually timed exposure, an exposure value about equal to the lowest of the exposure values which can be covered when using the shutter and speed-diaphragm coupling.

Furthermore it is of great advantage for the user of such a camera that he can, without being burdened at the start by complicated apparatus, recognize and use with increasing interest and increasing skill, the picture taking possibilities of a well considered diaphragm selection. The limiting of the free diaphragm aperture selection at first to time exposures, i.e., to the photographing of objects at rest, in this connection furthers his desire for better quality pictures, in that it necessarily brings about the expenditure of time indispensable for a conscientiously planned photograph and thus helps to avoid failures.

Finally the essential advantage of the camera of the invention results automatically for the user in that even in the region of the exposures which are controlled by the shutter i.e., of the instantaneous exposures, the rigid connection between the shutter speed control member and the diaphragm aperture control member may be eliminated so that both time of exposure and diaphragm aperture can be freely selected. In this way, however, all possibilities of planning the picture within the capabilities of the taking lens are assured, since a universally applicable camera is provided for the user interested in graduating from using the original "simple camera." The additional equipping of the camera of the invention with the known devices for interchangeable lenses and for flash synchronization finally opens up extensive possibilities of use.

The surprising effect of the invention resides in the fact that a camera is created which despite the ease of construction can both be used as a "simple camera" and can also be provided with a fast lens and with all possibilities of adjustment which are demanded of a high quality amateur camera. In this connection it is of particular advantage that both types of use are possible in direct sequence since they depend only on the will of the user and not on costly attachments, to say nothing of reconversions.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter and diaphragm assembly comprising a rotationally stationary member, a shutter speed control member rotatable relative to said stationary member through an internally timed exposure range controlling internally timed exposures between the limits of the fastest internally timed exposure and the slowest internally timed exposure and having a bulb exposure position beyond the slowest internally timed limit of said range, and a diaphragm aperture control member also rotatable relative to said stationary member through a range between the limits of maximum aperture and minimum aperture, characterized by the fact that rotation of said speed control member to control a faster exposure is in the same direction as rotation of said aperture control member to decrease the size of the diaphragm aperture, and by the fact there is releasable coupling means for coupling said speed control member and said aperture control member to each other for conjoint rotation in the same direction, in only a single position of relative orientation of said control members with respect to each other, said coupling means being ineffective to couple said control members to each other in all other positions of relative orientation, said single position in which said two control members are coupled to each other being a position of relative orientation in which said speed control member is in an intermediate position at a substantial distance from the slowest limit of its said range and said diaphragm aperture control member is at the maximum aperture limit of its said range, so that said speed control member can not be moved to the slowest limit of its internally timed range except when said coupling means is released.

2. A photographic shutter and diaphragm assembly comprising a rotationally stationary member, a shutter speed control member rotatable relative to said stationary member through an internally timed exposure range controlling internally timed exposures between the limits of the fastest internally timed exposure and the slowest internally timed exposure and having a bulb exposure position beyond the slowest internally timed limit of said range, and a diaphragm aperture control member also rotatable relative to said stationary member through a range between the limits of maximum aperture and minimum aperture, characterized by the fact that rotation of said speed control member to control a faster exposure is in the same direction as rotation of said aperture control member to decrease the size of the diaphragm aperture, and by the fact there is releasable coupling means for coupling said speed control member and said aperture control member to each other for conjoint rotation in the same direction, said coupling means being in the form of a notch in said aperture control member and a resilient arm on said speed control member resiliently urged into engagement with said notch, and further characterized by a notch in said stationary member for engaging a portion of said resilient arm when said speed control member is in said bulb exposure position and serving simultaneously to hold said speed control member resiliently in said bulb exposure position and to hold said resilient arm out of cooperative engagement with said notch in said aperture control member.

References Cited in the file of this patent

UNITED STATES PATENTS

| | | |
|---|---|---|
| 1,584,408 | Topliff et al. | May 11, 1926 |
| 2,926,587 | Gebele | Mar. 1, 1960 |
| 2,938,446 | Singer | May 31, 1960 |
| 2,993,425 | Rentschler | July 25, 1961 |
| 2,999,438 | Nerwin | Sept. 12, 1961 |

FOREIGN PATENTS

| | | |
|---|---|---|
| 312,586 | Switzerland | Mar. 29, 1956 |
| 799,837 | Great Britain | Aug. 13, 1958 |